United States Patent Office 3,282,886
Patented Nov. 1, 1966

3,282,886
POLYCARBONAMIDES OF IMPROVED PHOTO-STABILITY AND DYE LIGHTFASTNESS
Filon Alexander Gadecki, Wilmington, Del., assignor to E. I. du Pont de Nemours and Company, Wilmington, Del., a corporation of Delaware
No Drawing. Filed July 27, 1962, Ser. No. 212,999
10 Claims. (Cl. 260—45.7)

This invention relates to novel polyamides having a component which enhances the photostability and dye lightfastness of the polymer and more particularly to fiber- and film-forming synthetic linear polyamides containing the novel component.

Synthetic linear condensation polyamides have attracted high commercial interest for many uses owing to their high tenacity, flexibility, toughness and other valuable properties. Many variations in polyamide compositions are known and methods for their preparations have been adequately disclosed, e.g., U.S. 2,766,222, U.S. 2,272,466, U.S. 2,190,770, U.S. 2,158,064, U.S. 2,149,273, U.S. 2,130,948, U.S. 2,130,523, and U.S. 2,071,250.

In common with many organic materials, especially synthetic polymers, polyamides undergo degradation when exposed to sunlight. This degradation is manifested in their loss of strength and in a reduction of molecular chain length in some classes of polyamides. In other classes of polyamides the degradation is particularly evident in a discoloration or yellowing of the polymer. Although different species of polyamides exhibit somewhat different resistance to sunlight degradation, it is generally true that an improved resistance to such degradation is desirable for all polyamides in some end uses. For example, one of the major limitations of 66 nylon, the polyamide of hexamethylene diamine and adipic acid, for greater penetration into the upholstery, home furnishing and apparel markets is the relatively poor lightfastness of dyed materials.

Attempts to improve the resistance of polyamides to photochemical degradation have been made by coating the polyamide with, or incorporating into the polyamide by a dyeing procedure, an organic compound which has the power to absorb ultraviolet light rays. Although some degree of success has been achieved, the procedures described in the prior art have not been wholly satisfactory. A particularly unsatisfactory feature has been the poor abrasion resistance of ultraviolet absorbing coatings, and the poor washfastness of ultraviolet absorbing compounds which have been dyed into the polyamide article. Thus, for example, polyamide textile fibers protected from ultraviolet light by prior art processes are found to rapidly lose their protection when subjected to normal use conditions consisting of repeated wearing, washing and ironing or dry cleaning.

It is an object of this invention to provide synthetic linear condensation polyamides which have enhanced resistance to photodegradation. An additional object is the chemical modification of polyamides to improve their photostability in the undyed as well as dyed form. Another object is to provide synthetic linear condensation polyamides in the form of shaped articles which are resistant to discoloration or loss of strength upon exposure to ultraviolet light. A further object is to provide a process for the production of a synthetic linear condensation polyamide from which shaped articles having a high resistance to ultraviolet light degradation can be prepared. Other objects will be apparent from the following description and claims.

In accordance with the present invention, it has been found that a polyamide having enhanced resistance to photodegradation can be prepared by the polycondensation of amide-forming monomers containing a compound, preferably bearing one or more amide-forming groups, which exhibits a strong absorption for electromagnetic radiation having a wave length in the range 290–390 millimicrons, and which has little or no absorption in the range 400–800 millimicrons. The product of this invention is, accordingly, a synthetic linear condensation polyamide containing, in addition to recurring amide linkages as an integral part of the polymer chain, a repeating organic radical capable of absorbing electromagnetic radiation in the wave length range 290–390 millimicrons and which is transparent in the visible region of the spectrum. The polyamide product is particularly characterized by a marked improvement in resistance to ultraviolet degradation, which improvement is washfast, sublimation-fast and abrasion-proof. Furthermore, the improvement obtained is considerably greater than that given by an equivalent quantity of the same ultraviolet absorbing agent when coated on the surface of the polyamide or when dispersed in the polyamide by a solution procedure. It is significant that the polyamides of the invention containing recurring radicals of the particular U.V. absorbing compounds improve not only the photostability of the polymers but the dye lightfastness of dyed polymers as well. This feature is a real advantage in comparison with many so-called "U.V. screeners" which simply stabilize the polymer against degradation. Preferably, the polyamide contains from about 0.05–10 mol percent of the ultraviolet absorbing units, based upon the number of amide linkages present in the polyamide. In a preferred embodiment of this invention, the ultraviolet absorbing unit contains an N-substituted benzotriazole nucleus.

The radical in the polyamide chain which carries the ultraviolet absorbing unit may be attached to the polyamide chain by one, two, or even more amide linkages. It will be recognized that the radical will act as a cross-linking agent if it is attached to the polymer molecule by more than two amide linkages. When it is desired to extrude the polymer into yarn, radicals capable of being attached to the polymer molecule by more than two amide linkages will usually be avoided. In the preferred embodiment of this invention the monomeric unit will be difunctional with two amide-forming units and hence can be present in the polymer chain as an intralinear repeating unit. Alternatively it can be monofunctional, acting as a chain terminator. In either case, whether the ultraviolet absorbing unit is monofunctional or difunctional, the product of the invention will be a synthetic linear polyamide of enhanced photostability and dye lightfastness having recurring amide linkages as an integral part of the polymer chain, and containing chemically bonded thereto a repeating organic radical which exhibits a strong absorption of electromagnetic radiation having a wavelength in the range of 290 to 390 millimicrons and no significant absorption of electromagnetic radiation in the range of 400 to 800 millimicrons and contains a 2(o-hydroxyphenyl)benzotriazole nucleus. Preferably the recurring ultraviolet absorbing radicals will be linked to the polymer chain by amide linkages.

In a preferred embodiment of the invention the foregoing synthetic linear polyamides of enhanced photostability and dye lightfastness having recurring amide linkages as an integral part of the polymer chain, are produced by condensing polyamide-forming materials in the presence of from about 0.05 to 10 mol percent, based upon the number of said linkages, of an ultraviolet absorbing benzotriazole compound of the formula:

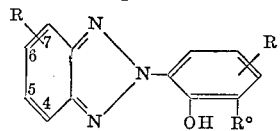

wherein:

One R is a radical which is either carboxyl, alkylcarboxyl, arylcarboxyl, amino, alkylamino, arylamino, or amide forming derivatives of any of those radicals, The other R is either hydrogen, alkyl of 1 to 6 carbon atoms, or the above mentioned amide forming radicals, and R° is hydrogen or alkyl of 1 to 6 carbon atoms. Examples of amide-forming groups represented by R include —COOH, —CH$_2$—COOH, p-phenyl—COOH, —NH$_2$,

—CH$_2$—NH$_2$, =(CH$_2$)$_x$—NH$_2$ where $x$ is 2–4, p-phenyl—NH$_2$. Desirably such groups are in the 5 position of the benzotriazole ring.

At least one, although preferably both, of the R groups must be able to react with the polyamide forming components as indicated. Examples of suitable ultraviolet absorbing compounds containing the benzotriazole nucleus and which are derivatives of 2-(o-hydroxyphenyl)-benzotriazole include:

2(2'-hydroxy-3'-butyl-5'-carboxyphenyl)-5-carboxybenzotriazole,
2(2'-hydroxy-3'-butyl-5'methylphenyl)-5-carboxybenzotriazole,
2(2'-hydroxy-5'-methylphenyl)-5-carboxybenzotriazole,
2(2'-hydroxy-5'-carboxyphenyl)-5-carboxybenzotriazole,
2(2'-hydroxy-3'-methyl-5'-carboxyphenyl)-5-carboxybenzotriazole,
2(2'-hydroxyphenyl)-5-carboxybenzotriazole,
2(2'-hydroxy-5'-carboxyphenyl)benzotriazole,
2[2'-hydroxy-5'-(carboxymethyl)phenyl]-benzotriazole, and
2(2'-hydroxy-5'-methylphenyl)-5-aminoethylbenzotriazole.

The term "amide-forming" with "group" or "radical," as used herein refers to either of the complementary radicals, hydroxycarbonyl and amino

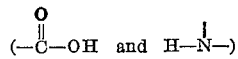

both primary and secondary type, which react with the elimination of water to form a carbonamido radical

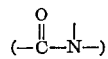

The term also includes functional groups equivalent to the amino group, such as amine salts as well as functional groups equivalent to the hydroxy carbonyl groups, such as carbonyl halides, anhydrides, salts and amides with monofunctional amines. Similarly, compounds containing amide-forming groups are designated as "amide-forming compounds." Of course each of the complementary hydroxycarbonyl and amino radicals or functional groups derived from them, either distinct as such or combined as in the case of a lactam, must be present in the reaction mixture for polycondensation to proceed; and any significant excess of one of the complementary groups with respect to the other is removed during the reaction usually by volatilization of compounds containing such groups. Salts of a dicarboxylic acid and a diamine function as an intermediate from which polycondensation can be initiated directly. It will be noted that polymerization of a derivative such as a lactam is, in the above sense, regarded as a condensation reaction even though no by-product is formed.

The terms "synthetic linear polyamide" and "synthetic linear condensation polyamide," as used herein, comprehend a substantially linear polymer of fiber-forming molecular weight comprising a series of predominantly carbon atom chains joined by intralinear recurring divalent amide radicals, each of the amide radicals comprising a carbonyl group attached on one side with an amido nitrogen atom on the other. As used herein, the term "polyamide" is intended to include copolyamides, terpolyamides, and the like.

Among the especially preferred polyamides of this invention are those which are of fiber-forming molecular weight, e.g., having an inherent viscosity of at least 0.25 as measured in 100 milliliters of solvent at 30° C. Values of inherent viscosity are calculated from the equation:

$$\text{Inherent viscosity} = \frac{\ln R}{C}$$

wherein R is the viscosity of a solution of 0.5 gram of the polymer in 100 milliliters of solvent at 30° C. divided by the viscosity of the solvent in the same units and at the same temperature, and C is the concentration of the polymer solution in grams of polymer per 100 milliliters of solution.

The modified synthetic linear condensation polyamides of this invention may be formed into various types of shaped articles such as fibers, films, ribbons, rods, pellicles, bars, sheets, and the like. Such articles exhibit a greatly improved resistance to ultraviolet light degradation. Furthermore, this protection from ultraviolet light is found to be wash-fast, sublimation-fast, and not subject to removal by surface abrasion.

An additional advantage, which is particularly important for textile fibers, is the fact that the light-fastness of dyes incorporated in the stabilized polyamide is also markedly improved. Thus, dyes of poor or borderline lightfastness may be used successfully in the polyamides of this invention, giving products having a greater range of useful color shades than were available previously.

Surprisingly, the inclusion of an ultraviolet light absorbing unit in the molecular chain of the polyamide is found to give a marked improvement in resistance to ultraviolet light when compared with the results obtained with an equivalent amount of a similar or identical ultraviolet light absorbing compound which is coated on the surface of the article, dissolved in the polymer as by dyeing procedure, or incorporated in casting solutions. The reasons for this unexpected improvement in ultraviolet light stability are not fully understood, but the fact of the improvement can be readily demonstrated in both laboratory tests and full scale use test.

The following examples are cited to illustrate the invention although they are not intended to limit it in any respect. Parts are given in percent by weight, unless otherwise specified.

The dyeing procedures employed, indicated by the designations "A," "B," "C," are as follows.

Prior to deying the fabric samples are scoured for ½ hour at 70° C. in a 1% solution of alkylpolyoxyethylene sulfate surface active agent. The procedures are listed below.

In each case, the dye bath contains 0.5% dye, based on weight of fabric.

A. In addition to the dye, the dye bath contains 0.5% of the sodium salt of an ethylenically unsaturated long chain alcohol sulfate and 1% of glacial acetic acid.

B. The dye bath contains 0.5% ethylene oxide/propylene oxide condensation product as a leveling agent. The sample is added at room temperature, the bath is brought to a boil and held there for ½ hour. From 1–10% ammonium acetate is added as required to exhaust. The boil is continued for ½ hour and the sample is then rinsed and dried.

C. The dye bath contains 2.0% sodium salt of an ethylenically unsaturated long chain alcohol sulfate, and 1% trisodium phosphate. The bath is heated to about 50° C., the sample is added and the temperature is slowly raised to about 85° C. Dyeing is continued for one hour after which the sample is rinsed and dried.

EXAMPLE I

In a 4-liter flask were placed 2 liters of a 35% aqueous solution of bis(4-aminocyclohexyl)methane-azelaic acid salt and 0.7 gram of 2(2'-hydroxy-3'-butyl-5'-methylphenyl)-5-carboxybenzotriazole. The water was distilled off at atmospheric pressure. Polymerization was carried out at an oil bath temperature of 320–350° C. for a period of 1.5 hours. After the polymerization was completed, the polymer was allowed to cool under nitrogen, removed from the flask, and cut to 1/8" flake. It was spun to 34-filament yarn, using a 1" screw melter. The spinning temperature was in the region of 310° C. The spun yarn was drawn 3.5× at a temperature of 165–180° C. The yarn was then knit to tubing and cut into pieces 3" long. These tubes were then dyed by the standard procedure and the test item plus a control containing no screening agent were mounted on strips 1 5/8" x 5". These were exposed in a Xenotester for given periods of time and then evaluated for lightfastness (see Table 1a).

Even at this low concentration, there was a discernible improvement in dye lightfastness. Other dyes including C.I. 23900 yellow and red C.I. 23635 were evaluated and found to give similar results. Other portions of the undyed drawn yarns were mounted on strips 2 5/8" x 8" and exposed in a Fadeometer for given periods of time. The tenacity was measured at these time intervals and resulted in the data illustrated in Table 1b. In the preparation of the polyamide about 0.055 mole of screener per 100 moles amide linkages were employed.

*Table 1a*

| Dye | Xeno Hours | PACM-9[1] Control | PACM-9[1] plus 0.1% U.V. Screener[2] Test | Dye Process |
|---|---|---|---|---|
| Blue—C.I. 62055 | 80 | [3] 4–3 | 5–4 | A |
| Yellow—C.I. 11855 | 80 | 4–3 | 5 | C |
| Blue—C.I. 61505 | 80 | 3 | 4 | C |
| Red [4] | 80 | 4 | 5–4 | B |

[1] Polyamide from bis(4-aminocyclohexyl)methane and azelaic acid
[2] 0.1% 2-(2'-hydroxy-3'-butyl-5'-methylphenyl)-5-carboxybenzotriazole.
[3] 5=no break, 1=severe break (Tech. Manual of AATC & C, Vol. XXXVI, p. 77, 1960).
[4] The cobalt complex dye of Ex. 3 of German Pat. 743,155.

*Table 1b*

Time required to half tenacity loss, hrs.
Polyamide from bis(4-aminocyclohexyl)methane and azelaic acid (control) _____ 450
Polyamide from bis(4-aminocyclohexyl)methane and azelaic acid plus 0.1% of 2-(2'-hydroxy-3'-butyl-5'-methylphenyl)-5-carboxybenzotriazole _____ 900

EXAMPLE 2

In each of two large size, heavy-walled polymer tubes were placed the following: 60 grams of hexamethylene diammonium adipate (66 nylon salt) and 0.3 gram of 2-(2'-hydroxy-5'-methylphenyl)-5-carboxybenzotriazole. The tubes were thoroughly purged with nitrogen and evacuated and then sealed at reduced pressure. The sealed tubes were heated at 265° for one hour. At the end of that period the tubes were opened and, under an atmosphere of nitrogen, were heated at 283° for one hour. The polymers were allowed to cool, were removed, and were then cut to 1/8" flake. The polymer was spun to yarn using the 1 inch screw melter at a temperature of about 290° C. The yarn was drawn 4× and then knit to tubing. The tubing was dyed by the standard procedure and exposed in the same fashion as described in Example 1 (see Table 2a).

*Table 2a*

| Dye | Xeno Hours | Nylon 66 Control | Nylon 66 plus 0.50% U.V. Screener[1] | Dye Process |
|---|---|---|---|---|
| Yellow—C.I. 23900 | 80 | 3 | 5–4 | A |
| Red—C.I. 23635 | 160 | 3–2 | 4–3 | A |
| Blue—C.I. 62055 | 160 | 3 | 5–4 | A |
| Yellow—C.I. 11855 | 160 | 4+ | 5 | C |
| Blue—C.I. 61505 | 160 | 3 | 4+ | C |

[1] 0.50% 2-(2'-hydroxy-5'-methylphenyl)-5-carboxybenzotriazole, 0.21 mole/100 moles amide.

The undyed yarns were exposed in the Fadeometer. Tenacity loss was as follows:

*Table 2b*

Time required to half tenacity loss, hrs.
Nylon 66 control _____ 140
Nylon 66 control plus 1.0% 2-(2'-hydroxy-5'-methylphenyl)-5-carboxybenzotriazole _____ 190

The U.V. screener content was 0.42 mole/100 moles amide linkages. There was observed an improvement in dye lightfastness and light durability with the items that contained the U.V. screener.

EXAMPLE 3

In heavy-walled polymer tubes were placed the following: 60 grams of 66 nylon salt and 1.8 grams of 2-(2'-hydroxy-3'-butyl-5'-methylphenyl)-5-carboxybenzotriazole and 0.10 grams of manganese hypophosphite. Polymers were prepared by the procedure described in Example 2. The polymer flake so obtained was mechanically mixed with commercial 66 semi-dull nylon polymer (45 relative viscosity, 0.3% $TiO_2$) and yarns were spun, drawn, knit to tubing, dyed, and exposed in the Xenotester for lightfastness. The results are illustrated in Table 3 and indicate that there was an appreciable improvement in dye lightfastness. Another surprising result was the unexpected improvement in dye lightfastness of the yarn containing the U.V. screener and manganese hypophosphite compared to the yarn containing the U.V. screener alone.

*Table 3*

| Dye | Xeno Hours | 66 Nylon S.D. | 66 Nylon S.D. Plus 1.0% U.V. Screener [1] | 66 Nylon S.D. Plus 1.0% U.V. Screener [2] Plus 0.01% Manganese Hypophosphite | 66 Nylon S.D. Plus 0.01% Manganese Hypophosphite | Dye Process |
|---|---|---|---|---|---|---|
| Red—C.I. 23635 | 80 | 2–1 | 3 | 4–3 | 2–1 | A |
| Blue—C.I. 62055 | 80 | 2–1 | 4 | 5–4 | 2–1 | A |
| Green—C.I. 61570 | 80 | 2 | 5–4 | 5 | 3–2 | A |
| Br Blue—C.I. 61505 | 80 | 2 | 4 | 4+ | 3–2 | C |
| Blue—C.I. 62500 | 80 | 1 | 3 | 4+ | 2 | C |

[1] 2-(2'-hydroxy-3-butyl-5'-methylphenyl)-5-carboxybenzotriazole, 0.35 mole per 100 moles amide.
[2] 2-(2'-hydroxy-5'-methylphenyl)-5-carboxybenzotriazole, 0.42 mole U.V. screener/100 moles amide.

EXAMPLE 4

Undyed 66 nylon yarns containing 2-(2'-hydroxy-5'-methylphenyl)-5-carboxybenzotriazole were prepared by the procedure outlined in Example 2 and then exposed in the Fadeometer to determine tenacity retention. The exposure and method of mounting in the Fadeometer were as described in Example 1.

The unexpected, superior light stability imparted to polyamides containing delustrants and pigments by the combination of a U.V. screener [derivatives of 2-(o-hydroxyphenyl)benzotriazole] and manganese hypophosphite as compared to protection if either substance is present alone is illustrated in Table 4. Consequently, the surprising synergistic effect of the U.V. screener of this invention and manganese hypophosphite applies to both the dye lightfastness and light stability of polyamides.

Table 4

| Sample: | Time to 50% tenacity loss, hrs. |
|---|---|
| 66 nylon (semidull) | 75 |
| 66 S.D.+0.3% U.V. screener [1] | 125 |
| 66 S.D.+0.3% U.V. screener [1] +0.01% manganese hypophosphite | 800 |
| 66 S.D.+0.01% manganese hypophosphite | 375 |

66 SD=66 nylon (semidull).
[1] 0.3% 2 - (2'-hydroxy-5'-methylphenyl)-5-carboxybenzotriazole, 0.13 mole per 100 moles amide.

EXAMPLE 5

In a 1-liter, round bottom flask were placed the following: 200 grams of commercial 66 dead bright polymer (67 relative viscosity), 0.6 gram of sodium phenylphosphinate, 10.0 grams of polyethylene ether glycol of 20,000 molecular weight, 0.02 gram of manganese hypophosphite, and 2.0 grams of 2-(2'-hydroxy-5'-methylphenyl)-5-carboxybenzotriazole. The flask was purged with nitrogen and repeatedly evacuated. Under an atmosphere of nitrogen, the contents of the flask were heated to a temperature of 310° C. for one hour with mechanical mixing. The polymer was allowed to cool under nitrogen. It was removed, cut to ⅛" flake. The original polymer (commercial, dead bright) had 36 equivalents of —NH₂ and 65 equivalents of —COOH ends/10⁶ gms. of nylon. Analysis of the ⅛" flake containing the U.V. screener showed a relative viscosity of 37, 32 equiv. of —NH₂ and 89 equivalents of —COOH ends/10⁶ gms. of nylon. This analysis showed that the heating step in the presence of the acidic U.V. screening compound depolymerized the nylon (viscosity decreased), increasing the number of —NH₂ and —COOH ends. The —NH₂ ends reacted with the —COOH of the U.V. screener.

Yarns were prepared, drawn, knit to tubing, dyed and exposed for lightfastness as described in Example 2. The results are described in Table 5 and indicate that there was an improvement in the dye lightfastness with the items containing the U.V. screener.

Although the above technique involving chemical combination of an already polymerized polyamide with the ultraviolet absorbing benzotriazole compounds via controlled depolymerization affords a convenient laboratory means for readily determining the effectiveness of such compounds, the technique is not preferred for most purposes since it involves an extra operation and can result in undue degradation of the polymer.

Table 5

| Dye | Xeno Hours | Polymer A [1] | Polymer A [1] Plus 1.0% U.V. Screener [2] | Dye Process |
|---|---|---|---|---|
| Green—C.I. 61570 | 80 | 4-3 | 4+ | A |
| Red [3] | 80 | 3 | 4 | B |
| Blue—C.I. 62500 | 80 | 2-1 | 4+ | C |
| Blue—C.I. 61505 | 80 | 2-1 | 4 | C |

[1] 66 nylon containing polyethylene ether glycol, sodium phenylphosphinate and manganese hypophosphite.
[2] 2(2'-hydroxy-5'-methylphenyl)-5-carboxybenzotriazole.
[3] The red dye of Example 1.

Similar results were obtained by the foregoing procedure employing polymerized caprolactam as the polymer which was modified with the benzotriazole U.V. screener. The latter was also used in the proportion of 1.0% based on the starting polyamide, the glycol and manganous salt being omitted.

EXAMPLE 6

In each of two large size, heavy-walled polymer tubes were placed the following: 60 g. of 66 nylon salt and 1.2 g. of 2-(2'-hydroxy-3'-butyl-5'-carboxyphenyl)-5-carboxybenzotriazole. The procedures for polymerization, spinning, drawing, dyeing and exposure in the Xenotester were the same as described in Example 2. The amounts are shown in Table 6 and demonstrate an improved dye lightfastness with the item containing the U.V. screener, the concentration of which was 0.66 mole/100 moles amide units.

Table 6

| Dye | Xeno Hours | Nylon 66 Control | Nylon 66 plus 2% U.V. Screener [1] | Dye Process |
|---|---|---|---|---|
| Yellow—C.I. 23900 | 80 | 3 | 5 | A |
| Blue—C.I. 62055 | 80 | 5-4 | 5 | A |
| Yellow—C.I. 11855 | 80 | 5-4 | 5 | C |
| Blue—C.I. 16505 | 80 | 4-3 | 5 | C |

[1] 2-(2'-hydroxy-3'-butyl-5'-carboxyphenyl)-5-carboxybenzotriazole.

As a control, 2-(2'-hydroxy-5'-methylphenyl)benzotriazole (a derivative which cannot react chemically with the polyamide-forming components and thus was not part of the polymer chain) was melt blended with 66 nylon in different concentrations. In each case, excessive sublimation was noted at the melt temperature of nylon. The items were spun to yarn, drawn, and spectrally analyzed. The concentration of 2 - (2' - hydroxy-5'-methylphenyl) benzotriazole had dropped from 2.0% to about 0.02%. It was also observed that some material could be removed by extraction with dry cleaning solvents or scouring solutions. The yarns, as knit tubing, were dyed and exposed in the Fadeometer. There was no improvement in dye lightfastness noted. This is due to the fact that the U.V. screeners of the benzotriazole type which are not chemically combined with the polyamide, are unstable or are extracted during polymerization, scouring, dyeing, washing, dry cleaning, etc.

EXAMPLE 7

Following the procedure of Example 5 and employing the 66 dead bright polymer thereof without the polyethylene ether glycol or manganous salt, yarns containing the indicated concentrations of U.V. screeners (Table 7) were prepared, knitted and dyed with representative dyes. The lightfastness of the dyes was tested as before with the results indicated in Table 7. The table also includes results with a 66 nylon control containing no screener.

Table 7

| Dye | Xeno hours | 66 control | 1% of (1) | 1% of (2) | 2% of (3) | Dye process |
|---|---|---|---|---|---|---|
| Yellow—C.I. 23900 | 80 | 3 | 4+ | 4+ | 5 | A. |
| Red—C.I. 23635 | 80 | 2 | 3– | 3 | 4– | A. |
| Blue—C.I. 65055 | 80 | 3 | 4 | 4+ | 5– | A. |
| Green—C.I. 61570 | 80 | 4 | 5– | 5– | 5– | A. |
| Blue—C.I. 62500 | 80 | 3 | 4+ | 4+ | 5 | C. |
| Blue—C.I. 61505 | 80 | 4 | 4+ | 5– | – | C. |
| Red Dye of Ex. 1 | 120 | 4– | 5– | 5– | 5 | B. |

(1) 2-[2'-hydroxy-5'-(carboxymethyl)phenyl]benzotriazole.
(2) 2-(2'-hydroxy-3'-ethyl-5'-methylphenyl)-5-carboxybenzotriazole.
(3) 2-(2'-hydroxy-4'-butyl-5'-carboxyphenyl)-5-carboxybenzotriazole.
(4) Concentration in moles of U.V. screener per 100 moles amide linkages.

It will usually be desirable to use at least about 0.05 mol percent of the ultraviolet absorbing additive, based on the ratio of ultraviolet absorbing groups to amide linkages in the final polymer. Dyed polyamide fibers having a benzotriazole content of appreciably less than 0.05 mol percent, usually less than 0.25 mol percent, will have only a relatively low resistance to ultraviolet degradation, approximately that of the unmodified polyamide. Polymers having about 10 mol percent of the ultraviolet absorbing additive have a very high resistance to ultraviolet degradation. Higher concentration will not in general lead to appreciable increases in resistance to ultraviolet degradation and may lower the melting point of the polymer prohibitively. It will be realized that the monofunctional amide-forming derivatives act as chain terminators in the condensation reaction and will tend to lower the molecular weight of the polymer. Bifunctional amide-forming derivatives will usually be selected when polymers of especially high molecular weight are desired. In some instances, it may be desirable to mix two or more different types of ultraviolet light absorbing units, in which case the sum of the concentrations of such units should fall in the range of 0.05 to 10 mol percent.

The benzotriazole U.V. screeners of the invention can be produced by coupling properly substituted aryl diazonium compounds with suitable components of the benzene series, coupling in the o-positon to a primary amino group and oxidizing the o-aminoazo compound so formed to the desired 1,2,3-triazole material. The compounds can also be produced by coupling o-nitro aryl diazonium compounds of the benzene series with phenols, coupling in the o-position (since the p-position is usually substituted) or with amines of the benzene series coupling in the p-positions to a primary amino group, and then reducing the o-nitroazo compound by the usual methods, i.e., with ammonium sulfide or with zinc in an alkaline medium to form the 1,2,3-triazole compounds. In all these processes, the aromatic rings can be further substituted so as to give directly or lead to the desired reaction functional groups. Primary amino groups attached to the benzene nucleus must be removed by diazotizing them and replacing the diazo group, by the usual methods, preferably with the cyano group which can further be converted to the carboxyl or the alkyl amino group by conventional procedures (i.e., hydrolysis or reduction).

It will be apparent that formation of polyamides in accordance with this invention involves the chemical combination therewith of an ultraviolet absorbing compound containing a 2-(o-hydroxyphenyl)benzotriazole nucleus. In a preferred embodiment, repeating ultraviolet absorbing radicals of that nucleus will be attached to the polyamide chain by one or more amide groups as per

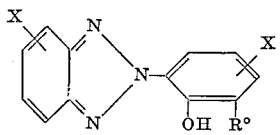

wherein:
One X is a linkage connecting the benzotriazole radical to the polyamide chain and contains an amide radical,
The other X can also be a connecting linkage containing an amide radical or can be hydrogen or alkyl of 1 to 6 carbon atoms, and
R° is as hereinbefore defined.

The utilization of a radiation absorbing compound having an amide-forming substituent in the 5 position of the benzotriazole ring, is especially desirable from the standpoint of stability. Thus a 5 carboxy substituent, as is particularly preferred, will yield a polyamide having recurring 2-(o-hydroxyphenyl)-5-carbonamidobenzotriazole radicals.

In an alternative, though not necessarily preferred, embodiment the radiation absorbing radical of the above formula may also be attached to the polymer chain by means of a carbon to carbon bond, normally as an ethylene group. Thus by employing a starting material in the polymerization containing one or two vinyl groups attached to the benzotrizole nucleus, rather than amide-forming groups, addition polymerization to the polyamide chain can be achieved by known graft polymerization techniques. With such techniques the benzotriazole nucleus will be attached by means of a carbon to carbon bond to a carbon atom of the polymer chain which is adjacent to a nitrogen atom. The products of the invention are therefore intended to embrace all polyamides having a 2-(o-hydroxyphenyl)benzotriazole nucleus chemically attached thereto although the use of amide linkages is preferred.

The invention broadly applies to linear polyamides whose carbonamide linkages are an integral part of the polymer chain. These include polyamides prepared by reactions of diamines and dicarboxylic acids and polyamides prepared from amino acids, and polyamides prepared from the amide forming derivatives of each.

A valuable class of diamines comprises diamines of the general formula:

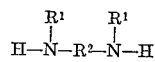

wherein $R^1$ is alkyl or hydrogen and $R^2$ is a divalent hydrocarbon radical free from aliphatic unsaturation and having a chain length of at least 2 carbon atoms. Especially useful within this group are diamines in which $R^2$ is $(CH_2)_x$ wherein $x$ is at least 4 and not greater than 10. Another valuable class of diamines comprises diamines of the general formula:

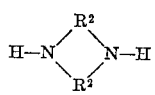

wherein $R^2$ is defined as above. Especially useful within this class is piperazine.

A valuable class of dicarboxylic acids are the dicarboxylic acids of the general formula:

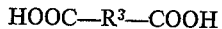

HOOC—R³—COOH wherein $R^3$ is a connecting bond or a divalent hydrocarbon radical free from aliphatic unsaturation. Especially useful within this group are the dicarboxylic acids wherein $R^3$ is $(CH_2)_y$ wherein $y$ is at least 3 and not greater than 8.

The polyamides so prepared are polycarbonamides wherein the amide linkages are an integral part of the main polymer chain; they have the repeating units:

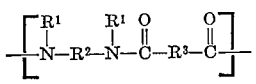

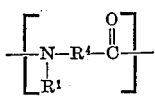

wherein R, $R^1$ and $R^2$ are as defined above the $R^4$ is $(CH_2)_z$ and z is a whole number of from 4 to 11.

Among the nylons prepared from amino acids a particularly valuable one for the application of this invention is the one prepared by polymerization of ω-amino caproic acid or its lactam ε-caprolactam. Other suitable polyamides include those described in the above enumerated U.S. patents.

Various other materials may be present in the reaction mixture. For example, polymerization catalysts, color inhibitors, pigments, delustrants, or other additives may be present.

As is apparent from the examples, an unexpected, synergistic effect in terms of both the dye light fastness and light stability of the polyamide is achieved if the polyamide contains an $Mn^{++}$ salt in addition to a derivative of 2-(o-hydroxyphenyl)benzotriazole as described in this invention. Such manganous salts are most advantageously employed in combination with the benzotriazole derivatives to improve the dye lightfastness and light stability of polyamides containing delustrants and/or pigments. Especially suitable manganous salts for use in accordance with this preferred embodiment are those described in U.S. Patent 2,887,462 to Van Oot, examples thereof including manganous oxalate, manganous sulfite, manganous hypophosphite, manganous sulfide, and manganous selenide. Desirably such manganous salts should be employed to the extent of about 10 to about 400 parts per million of manganese, weight basis on the polyamide composition. Even the utilization of as little as 5 parts per million of manganese will yield a discernible improvement in the desired properties. In addition, particularly in the case of dyed polymers, there is normally no objection to the use of as much as 5,000 parts per million aside from the matter of economics.

Shaped structures, for example filament and films, which have at least one dimension relatively very small and at least one dimension relatively large, are the preferred structures of the present invention. Yarns produced in accordance with the present invention are suitable for the usual textile applications, they may be employed in knitting or weaving fabrics of all types as well as in the production of non-woven or felt-like products produced by known methods. Their physical properties closely parallel those of their related polyamide fibers. In addition, they have enhanced resistance to ultraviolet degradation, especially discoloration resulting from ultraviolet exposure, and they also improve dye lightfastness performance.

It will be apparent that many widely different embodiments of this invention may be made without departing from the spirit and scope thereof, and therefore it is not intended to be limited except as indicated in the appended claims.

I claim:
1. A fiber- and film-forming synthetic linear polycarbonamide containing a manganese salt in an amount providing at least 5 parts per million of $Mn^{++}$, based on the weight of the polycarbonamide, and exhibiting a synergistic effect in terms of dye light fastness and light stability, said polycarbonamide having recurring carbonamide linkages as an integral part of the polymer chain containing chemically bonded thereto in the proportion of 0.05 to 10 mol percent, based upon the number of said carbonamide linkages, an ultraviolet absorbing benzotriazole radical of the formula

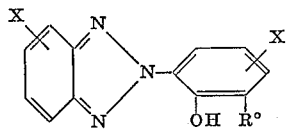

wherein:
  one X is a carbonamide linkage connecting the benzotriazole radical to the polycarbonamide chain,
  the other X is selected from the group consisting of hydrogen, alkyl of 1 to 6 carbon atoms, and said carbonamide linkages connecting the benzotriazole radical to the polycarbonamide chain, and
  R° is selected from the group consisting of hydrogen and alkyl of 1 to 6 carbon atoms,
  it being further provided that when both X's are carbonamide linkages said benzotriazole radicals are intralinear units of the said polycarbonamide, and that when one of said X's is other than a carbonamide linkage said benzotriazole radicals are chain terminators of the said polycarbonamide.

2. The polycarbonamide of claim 1 wherein said $Mn^{++}$ salt is manganous hypophosphite.

3. The polycarbonamide of claim 1 wherein the synthetic linear polycarbonamide contains recurring hexamethylene adipamide units.

4. The polycarbonamide of claim 1 wherein the synthetic linear polycarbonamide contains recurring ε-caproamide units.

5. The polycarbonamide of claim 1 wherein the synthetic linear polycarbonamide contains recurring bis[4-cyclohexylene]methane azelamide units.

6. The polycarbonamide of claim 1 wherein said radical is

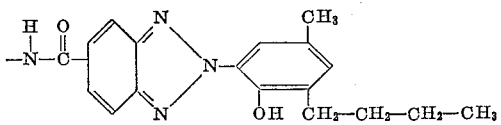

7. The polycarbonamide of claim 1 wherein said radical is

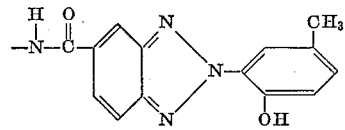

8. The polycarbonamide of claim 1 wherein said radical is

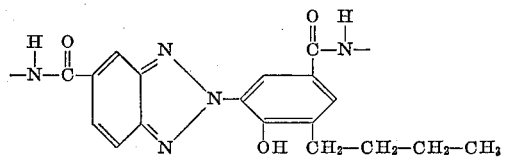

9. A film of the polycarbonamide of claim 1.
10. A filament of the polycarbonamide of claim 1.

(References on following page)

References Cited by the Examiner

UNITED STATES PATENTS

| | | | |
|---|---|---|---|
| 2,510,777 | 6/1950 | Gray | 260—78 |
| 2,512,606 | 6/1950 | Bolton et al. | 260—78 |
| 2,625,536 | 1/1953 | Kirby | 260—78 |
| 2,630,421 | 3/1953 | Stamatoff | 260—78 |
| 2,984,647 | 5/1961 | White | 260—78 |
| 2,995,540 | 8/1961 | Duennenberger | 260—45.8 |
| 3,004,896 | 10/1961 | Heller et al. | 260—45.8 |
| 3,018,269 | 1/1962 | Bruno | 260—45.8 |
| 3,074,910 | 1/1963 | Dickson | 260—45.8 |
| 3,076,782 | 2/1963 | Mohr et al. | 260—45.8 |
| 3,108,091 | 10/1963 | Illing et al. | 260—45.75 |
| 3,206,430 | 9/1965 | Corbin et al. | 260—45.75 |
| 3,213,058 | 10/1965 | Boyle et al. | 260—78 |

OTHER REFERENCES

Chemical Abstracts, vol. 56, January–June, 1962, Introduction to the Subject Index, page 88.

WILLIAM H. SHORT, *Primary Examiner.*

JOSEPH R. LIBERMAN, *Examiner.*

H. D. ANDERSON, *Assistant Examiner.*